United States Patent
Hong et al.

(10) Patent No.: US 9,973,323 B2
(45) Date of Patent: May 15, 2018

(54) ELECTRONIC DEVICE AND METHOD FOR PROVIDING COMMUNICATION SERVICE

(71) Applicant: Samsung Electronics Co., Ltd., Gyeonggi-do (KR)

(72) Inventors: Il-Pyo Hong, Gyeonggi-do (KR); Tae-Young Oh, Gyeonggi-do (KR); Young-Sang Hong, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 71 days.

(21) Appl. No.: 14/614,324

(22) Filed: Feb. 4, 2015

(65) Prior Publication Data
US 2015/0222411 A1 Aug. 6, 2015

(30) Foreign Application Priority Data
Feb. 4, 2014 (KR) ........................ 10-2014-0012629

(51) Int. Cl.
*H04B 1/00* (2006.01)
*H04W 68/00* (2009.01)
(Continued)

(52) U.S. Cl.
CPC ............... *H04L 5/14* (2013.01); *H04B 1/006* (2013.01); *H04L 5/08* (2013.01); *H04W 88/06* (2013.01)

(58) Field of Classification Search
CPC .. G08B 25/06; H04B 2203/5495; H04L 67/42
(Continued)

(56) References Cited

U.S. PATENT DOCUMENTS 4,885,564 A * 12/1989 Vercellotti ............ F25D 29/008
 340/12.37
8,520,696 B1 * 8/2013 Corral ..................... H04B 3/54
 370/463
(Continued)

FOREIGN PATENT DOCUMENTS

KR 101304782 B1 9/2013
WO WO 2013/150171 A1 10/2013

OTHER PUBLICATIONS

Extended European Search Report dated Apr. 28, 2015 in connection with European Patent Application No. 15153792.5; 10 pages.
(Continued)

*Primary Examiner* — Parth Patel
*Assistant Examiner* — Jason Harley

(57) ABSTRACT

An electronic device and method for providing a communication service are provided. The method of operating an electronic device includes: receiving a first signal transmitted through a first band and a second signal transmitted through a second band; determining a communication mode of the electronic device for processing the first signal and the second signal based on device information or environment information of the electronic device; and processing the first signal and the second signal using at least one of a first modem or a second modem functionally connected to the electronic device based on the communication mode, wherein the processing of the first signal and the second signal includes: processing, when the communication mode is a first mode, the first signal in the first modem and the second signal in the second modem; and processing, when the communication mode is a second mode, the first signal and the second signal in the first modem.

13 Claims, 6 Drawing Sheets

(51) Int. Cl.
*H04W 84/12* (2009.01)
*H04L 5/08* (2006.01)
*H04L 5/14* (2006.01)
*H04W 88/06* (2009.01)

(58) Field of Classification Search
USPC ........................................................ 340/538
See application file for complete search history.

(56) References Cited

U.S. PATENT DOCUMENTS

| | | | | |
|---|---|---|---|---|
| 2002/0150081 | A1* | 10/2002 | Fang | A61F 2/2493 370/352 |
| 2007/0021080 | A1 | 1/2007 | Kuriyama et al. | |
| 2007/0159981 | A1* | 7/2007 | Chang | H04B 3/54 370/252 |
| 2008/0055067 | A1* | 3/2008 | Curt | H04B 3/542 340/538.12 |
| 2008/0058665 | A1* | 3/2008 | Scholler | A61B 5/087 600/529 |
| 2008/0227485 | A1 | 9/2008 | Kim | |
| 2009/0016240 | A1* | 1/2009 | Sebastian | H04L 43/0876 370/253 |
| 2009/0312050 | A1* | 12/2009 | Tang | H04B 1/006 455/553.1 |
| 2010/0021176 | A1* | 1/2010 | Holcombe | H04B 10/1143 398/115 |
| 2010/0073149 | A1* | 3/2010 | Goldfisher | H04B 3/54 370/241 |
| 2010/0279709 | A1 | 11/2010 | Shahidi et al. | |
| 2010/0296419 | A1* | 11/2010 | Kim | H04B 1/0064 370/297 |
| 2011/0279109 | A1* | 11/2011 | Masuda | G01R 31/31917 324/96 |
| 2012/0275350 | A1* | 11/2012 | Kwok | H04B 1/406 370/277 |

OTHER PUBLICATIONS

International Search Report dated May 7, 2015 in connection with International Application No. PCT/KR2015/001128; 3 pages.

\* cited by examiner

ELECTRONIC DEVICE AND METHOD FOR PROVIDING COMMUNICATION SERVICE

PRIORITY

The present application is related to and claims the benefit under 35 U.S.C. § 119(a) of a Korean patent application filed in the Korean Intellectual Property Office on Feb. 4, 2014 and assigned Serial No. 10-2014-0012629, the entire disclosure of which is hereby incorporated by reference.

TECHNICAL FIELD

The present disclosure relates to an electronic device, and more particularly, to an electronic device and method for providing a communication service.

BACKGROUND

A wireless communication system has been developed to a broadband wireless communication system that provides a packet data service of a high speed and a high quality such as High Speed Packet Access (HSPA) and Long Term Evolution (LTE) of 3rd Generation Partnership Project (3GPP), High Rate Packet Data (HRPD) and Ultra Mobile Broadband (UMB) of 3GPP2, or a communication standard of 802.16e of Institute of Electrical and Electronics Engineers (IEEE) from a voice service of an initial stage.

As a wireless communication system is developed, in order to communicate with several communication networks, an electronic device (e.g., a user device such as a mobile terminal, a tablet computer, and a personal computer) supporting wireless communication may include a plurality of communication systems. For example, a circuit switching network (CS network) (e.g., a voice service through cdma 1× network) providing an audio communication service and a packet switching network (PS network) (e.g., a data service through LTE) providing a data transmitting and receiving service may together exist.

An electronic device providing a plurality of communication services should include an entire component (e.g., a Radio Frequency Integrated Chip (RFIC) or an antenna) appropriate to each communication system. Accordingly, a size or a produce cost of the electronic device increases.

SUMMARY

To address the above-discussed deficiencies, it is a primary object to provide an electronic device and method for continuing to provide a data service using a data communication system (e.g., LTE communication system) while providing a voice service.

Another aspect of the present disclosure is to provide an electronic device and method for controlling to prevent call drop of a voice service according to a voice modem by a data communication system (e.g., LTE communication system (modem)).

In accordance with an aspect of the present disclosure, a method for operating an electronic device includes: receiving a first signal transmitted through a first band and a second signal transmitted through a second band; determining a communication mode of the electronic device for processing the first signal and the second signal based on device information or environment information of the electronic device; and processing the first signal and the second signal using at least one of a first modem or a second modem functionally connected to the electronic device based on the communication mode, wherein the processing of the first signal and the second signal includes: processing, when the communication mode is a first mode, the first signal in the first modem and the second signal in the second modem; and processing, when the communication mode is a second mode, the first signal and the second signal in the first modem.

In accordance with another aspect of the present disclosure, an electronic device includes: a first antenna that receives a first signal transmitted through a first band; a second antenna that receives a second signal transmitted through a second band; a first modem connected to the first antenna; a second modem connected to the second antenna; and a diplexer that provides a signal received through the antennas to the first modem based on a communication mode of the electronic device, wherein the diplexer processes to provide the first signal to the first modem, when the communication mode is a first mode and processes to provide the first signal and the second signal to the first modem, when the communication mode is a second mode.

In accordance with another aspect of the present disclosure, there is provided a computer readable recording medium on which a program for executing operation of receiving a first signal transmitted through a first band and a second signal transmitted through a second band, operation of determining a communication mode of the electronic device for processing the first signal and the second signal based on device information or environment information of the electronic device, and operation of processing the first signal and the second signal using at least one of a first modem or a second modem functionally connected to the electronic device based on the communication mode is recorded.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
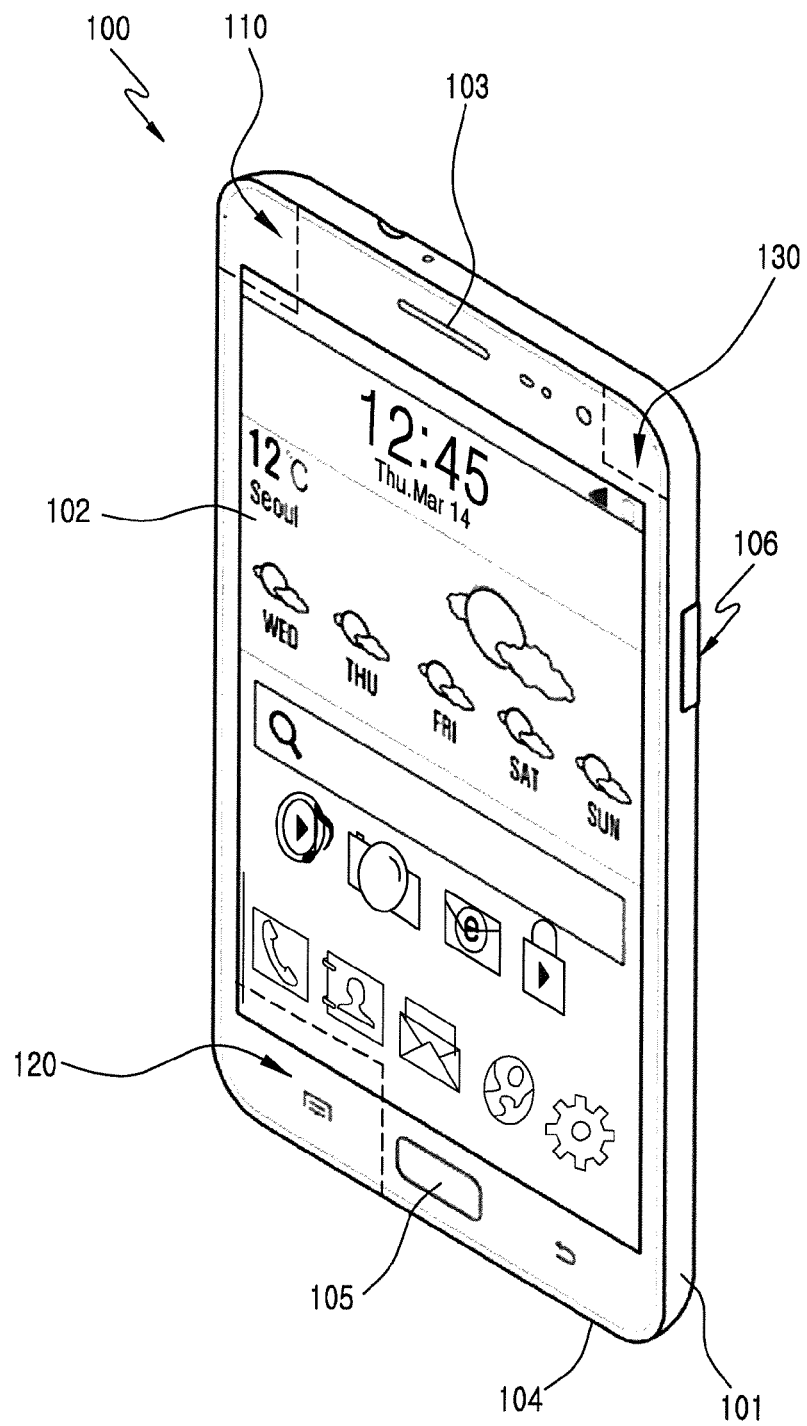
FIG. 1 is a perspective view illustrating an electronic device according to an embodiment of the present disclosure.

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications device. Hereinafter, embodiments of the present disclosure will be described in detail with reference to the accompanying drawings. Detailed descriptions of well-known functions and structures incorporated herein may be omitted to avoid obscuring the subject matter of the present disclosure. The terms used herein are defined according to the functions of the present disclosure and may vary depending on a user's or an operator's intension and usage. Therefore, the terms used herein should be understood based on the descriptions made herein.

Nowadays, due to rapid development of an electronic device, the electronic device that can exchange information or data is variously used. For example, the electronic device can provide a high speed data service based on an LTE service.

An electronic device providing a data service includes a modem (for convenience of description, hereinafter, a first modem) transmitting and receiving a signal of a first band and a modem (for convenience of description, hereinafter, a second modem) transmitting and receiving a signal of a second band, and each modem can be connected to a separate antenna. According to various exemplary embodiments, the signal of a first band includes a signal of a high frequency band, and the signal of a second band includes a signal of a low frequency band.

The electronic device includes a first antenna that can transmit and receive a signal of a first band, for example, a signal of 1.7 GHz-2.6 GHz and a second antenna that can transmit and receive a signal of a second band, for example, a signal of 850 Mhz-1.9 GHz.

According to an exemplary embodiment, the first antenna can transmit and receive a signal of 3G (e.g., 3G B1, B2), Frequency Division Duplex Long Term Evolution (FDD LTE) (e.g., FDD LTE B7), Time Division Synchronous Code Division Multiple Access (TDSCDMA) (e.g., TDSCDMA B34, B39), Time Division Duplex Long Term Evolution (TDD LTE) (e.g., TDD LTE B39, B38, B40), and the second antenna can transmit and receive a signal of 2G (e.g., 2G Quad) and 3G (e.g., 3G B5, B8).

The first antenna and the second antenna are disposed to reduce an electromagnetic wave absorption rate. According to an exemplary embodiment, a first antenna transmitting and receiving the signal of a first band is disposed at an upper end portion of the electronic device, a second antenna transmitting and receiving the signal of a second band is disposed at a lower end portion of the electronic device.

An electronic device according to the present disclosure can be at least one combination of various devices such as a smart phone, a tablet Personal Computer (PC), a mobile phone, a video phone, a netbook computer, a Personal Digital Assistant (PDA), a Portable Multimedia Player (PMP), an MPEG 3 (MP3) player, a camera, a wearable device, a wrist watch, a navigation device, a Global Positioning System (GPS) receiver, an Event Data Recorder (EDR), a Flight Data Recorder (FDR), an electronic dictionary, and a camcorder supporting a multimode in dual radio. It will become apparent to a person of ordinary skill in the art that an electronic device according to the present disclosure is not limited to the foregoing devices.

In the following description, in order to support a multimode in dual radio, it is assumed that an electronic device supports Simultaneously GSM and LTE (SGLTE) communication.

FIG. 1 is a perspective view illustrating an electronic device according to an embodiment of the present disclosure.

Referring to FIG. 1, in an electronic device 100, a frame 101 forms an external appearance of a rear surface thereof, and at a front surface thereof, a display module 102 is disposed. Here, the display module 102 can represent a touch screen including a touch panel that can simultaneously perform data input and output and a Liquid Crystal Display (LCD) module.

In the electronic device 100, in an upper portion of the display module 102, a speaker device 103 can be disposed, and in a lower portion thereof, a microphone device 104 and a home button 105 can be disposed.

In the electronic device 100, at a side surface thereof, a key button 106 can be disposed. For example, the key button 106 can be used as a volume key button or a power key button of the electronic device 100. According to an exemplary embodiment, the power key button is used as a mode conversion key button for converting an idle mode or an active mode of the electronic device 100.

At the inside of the electronic device 100, antennas for a communication service are disposed. According to an exemplary embodiment, the antennas are disposed at the inside of areas 110, 120 and 130 indicated by a dotted line of FIG. 1. In a first area 110 of FIG. 1, an antenna for transmitting and receiving a signal of a first band, for example, a signal of a high frequency band is disposed, and in a second area 120, an antenna for transmitting and receiving a signal of a second band, for example, a signal of a low frequency band is disposed. In a third area 130, a diversity antenna is disposed.

Figure 2:
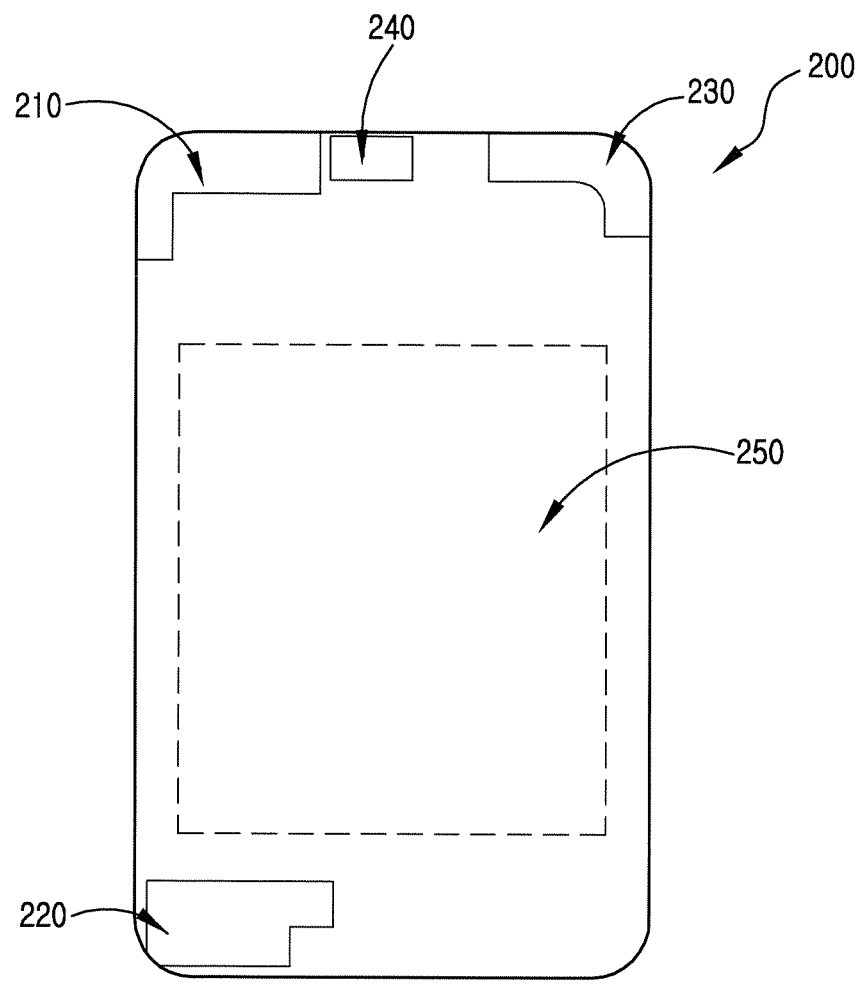
FIG. 2 is a layout view of an antenna of an electronic device according to an embodiment of the present disclosure.

FIG. 2 is a layout view of an antenna of an electronic device according to an embodiment of the present disclosure.

Referring to FIG. 2, at a front surface of an electronic device 200, a display module 250 is disposed.

An antenna disposition area of the electronic device 200 may be divided into, for example, an upper portion or a lower portion. For example, in FIG. 2, an antenna disposition area is divided into an upper portion or a lower portion based on the display module 250. In an upper portion of the electronic device 200, at least one of an antenna 210 for transmitting and receiving a signal of a first band, for example, a signal of a high frequency band, a satellite antenna 240 for receiving a satellite signal, or a diversity antenna 230 is disposed.

In a lower portion of the electronic device 200, an antenna 220 for transmitting and receiving a signal of a second band, for example, a signal of a low frequency band can be disposed.

Figure 3:
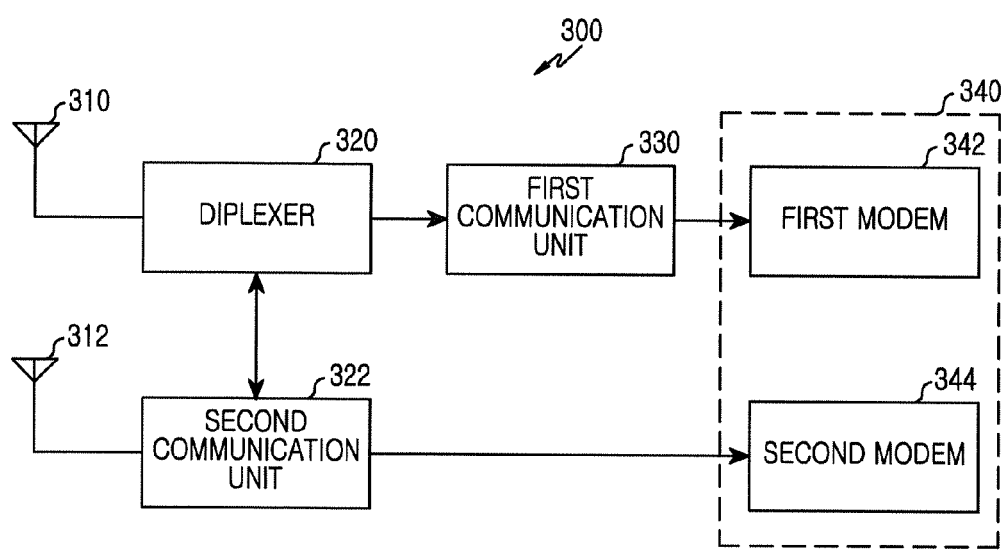
FIG. 3 is a block diagram illustrating a configuration of an electronic device according to an embodiment of the present disclosure.

According to certain embodiments, as shown in FIG. 3, the electronic device 200 processes a signal received through antennas according to a communication method of the electronic device using a diplexer.

FIG. 3 is a block diagram illustrating a configuration of an electronic device according to an embodiment of the present disclosure.

Referring to FIG. 3, in order to provide a plurality of communication services (e.g., LTE or GSM), an electronic device 300 includes antennas (e.g., a first antenna 310, a second antenna 312), a diplexer 320, communication units 330 and 322, and a modem 340. The modem 340 includes a plurality of modems (e.g., a first modem 342, a second modem 344) supporting different communication methods.

The first antenna 310 transmits and receives a signal of a first band, for example, a signal of a high frequency band. According to various embodiments, the first antenna 310 transmits and receives a signal of 1.7 GHz-2.6 GHz.

The second antenna 312 transmits and receives a signal of a second band, for example, a signal of a low frequency band. According to various embodiments, the second antenna 312 transmits and receives a signal of 850 MHz-1.9 GHz.

The diplexer 320 processes a signal received from the antennas 310 and 312 according to a communication method of the electronic device 300. According to an embodiment, when the electronic device 300 does not operate in an Simultaneously GSM & LTE (SGLTE) communication mode or Simultaneously Voice & LTE (SVLTE) communication mode, the diplexer 320 processes a signal received through the first antenna and a signal (e.g., a signal of bands B5 and B8 of a 3GPP specification) received through the second antenna to be transferred to the first modem 342. According to another embodiment, when the electronic device 300 operates in an SGLTE communication mode or an SVLET communication mode, the diplexer 320 processes a signal received through the first antenna 310 to be transferred to the first modem 342.

The first communication unit 330 processes a Radio Frequency (RF) signal transmitted and received through the first antenna 310 or the second antenna 312. According to an embodiment, the first communication unit 330 converts an RF signal of a first band received from the first antenna 310, for example, an RF signal of a high frequency band and an RF signal of a second band received from the second antenna 312, for example, an RF signal of a low frequency band to a baseband signal. According to various embodiments of the present disclosure, the first communication unit 330 converts an RF signal of LTE and 3G communication methods (e.g., 3G B5, B8) to a baseband signal. According to another embodiment, the first communication unit 330 converts a baseband signal received from the first modem 340 to an RF signal.

The second communication unit 322 processes an RF signal transmitted and received through the second antenna 312. According to an embodiment, the second communication unit 322 converts an RF signal of a second band received through the second antenna 312 to a baseband signal. According to various embodiments of the present disclosure, the second communication unit 322 converts an RF signal of a 2G communication method (e.g., 2G Quad) to a baseband signal. According to another embodiment, the second communication unit 322 converts a baseband signal received from the second modem 344 to an RF signal.

The first modem 342 processes a signal of a baseband for transmitting and receiving through the first communication unit 330. For example, when the electronic device 300 operates in an SGLTE communication mode or an SVLTE communication mode, the first modem 342 demodulates or modulates an LTE signal of a baseband. For another example, when the electronic device 300 does not operate in an SGLTE communication mode or an SVLTE communication mode, the first modem 342 demodulates or modulates a signal of a baseband according to any one of a 3G communication method and an LTE communication method. According to an embodiment, the 3G communication method includes at least one of a Wideband-CDMA (W-CDMA) network and a Time Division Synchronous CDMA (TD-SCDMA) network.

The second modem 344 processes a voice signal of a baseband for transmitting and receiving through the second communication unit 322 according to a communication mode (e.g., whether SGLTE or SVLTE operates). For example, when the electronic device 300 operates in an SGLTE communication mode or an SVLTE communication mode, the second modem 344 demodulates or modulates a signal of a baseband according to a 2G communication method. For another example, when the electronic device 300 does not operate in an SGLTE communication mode or an SVLTE communication mode, a mode of the second modem 344 can be converted to a low power mode or the second modem 344 can be deactivated. According to an embodiment, the 2G communication method includes at least one of a Global System for Mobile Communication (GSM) network, an Enhanced Data GSM Environment (EDGE) network, and a Code Division Multiple Access (CDMA) network.

Figure 4A:
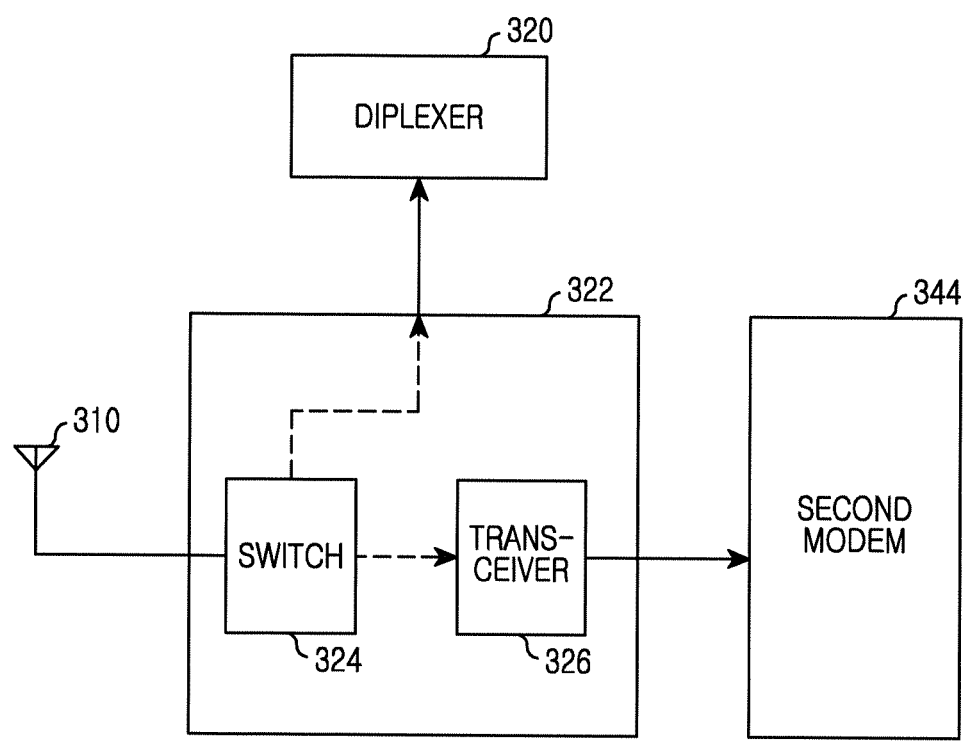
FIG. 4A is a block diagram illustrating a configuration of a second communication unit of an electronic device according to an embodiment of the present disclosure.

FIG. 4A is a block diagram illustrating a configuration of a second communication unit of an electronic device according to an embodiment of the present disclosure.

The second communication unit (e.g., the second communication unit of FIG. 3) 322 includes a switch 324 and a transceiver 326. The switch 324 processes an RF signal received through the second antenna 312 according to a communication method of the electronic device.

According to an embodiment, when the electronic device supports a 2G communication method (e.g., operating in an SGLTE communication mode or an SVLTE communication mode or operating in a 2G communication mode), in order to convert an RF signal received through the second antenna 312 to a baseband signal, the switch 324 provides the RF signal to the transceiver 326. By providing a baseband signal to the second modem, the transceiver 326 demodulates or modulates the baseband signal to a voice signal.

According to another exemplary embodiment, when the electronic device supports a communication method other than 2G (e.g., when not operating in an SGLTE communication mode or an SVLTE communication mode), the switch 324 provides an RF signal received through the second antenna 312 to the diplexer 320. The diplexer 320 provides an RF signal received through the first antenna 310 and a signal received through the second antenna 312 to the first communication unit (e.g., the first communication unit 330 of FIG. 3) as a broadband signal.

Figure 4B:
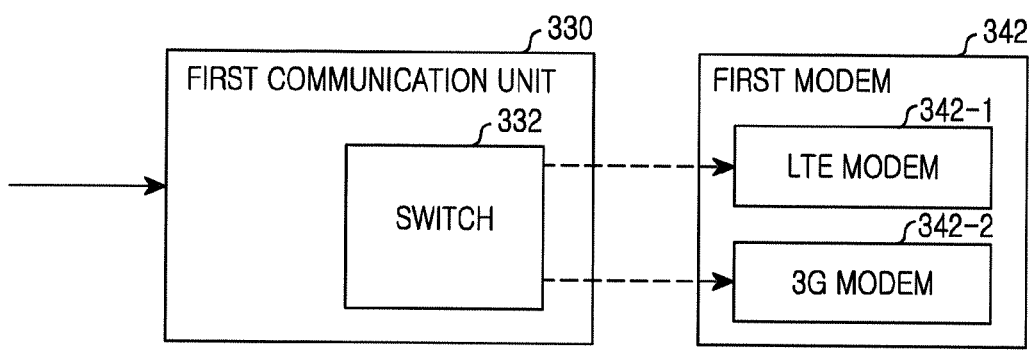
FIG. 4B is a block diagram illustrating a configuration of a first communication unit of an electronic device according to an embodiment of the present disclosure.

FIG. 4B is a block diagram illustrating a configuration of a first communication unit of an electronic device according to an embodiment of the present disclosure.

The first communication unit (e.g., the second communication unit of FIG. 3) 330 includes a switch 332, and the first modem (e.g., the first modem 342 of FIG. 3) includes an LTE modem 342-1 and a 3G modem 342-2. The switch 332 processes a signal received from the diplexer (e.g., the diplexer 320 of FIG. 3) according to a communication method of the electronic device. According to an embodiment, a signal received from the diplexer can be a broadband signal including a signal received from the first antenna (e.g., the first antenna of FIG. 3) or a signal received through the first antenna and the second antenna (e.g., the second antenna of FIG. 3).

According to an embodiment, when the electronic device supports an SGLTE communication mode or an SVLTE communication mode, the switch 332 provides a signal received from the diplexer to the LTE modem 342-1 of the first modem 342.

According to another embodiment, when the electronic device does not support an SGLTE communication mode or an SVLTE communication mode, the switch 332 provides a signal received from the diplexer to the 3G modem 342-2 of the first modem.

According to various embodiments, an electronic device electronic device includes: a first antenna that receives a first signal transmitted through a first band; a second antenna that receives a second signal transmitted through a second band; a first modem connected to the first antenna; a second modem connected to the second antenna; and a diplexer that provides a signal received through the antennas to the first modem based on a communication mode of the electronic device.

According to various exemplary embodiments, the diplexer processes to provide the first signal to the first modem, when the communication mode is a first mode and process to provide the first signal and the second signal to the first modem, when the communication mode is a second mode.

According to various embodiments, the first antenna receives a signal of a high frequency band.

According to various embodiments, the first antenna receives a signal of at least one of 3G, FDD LTE, TDSCDMA, and TDD LTE.

According to various embodiments, the second antenna receives a signal of a low frequency band.

According to various embodiments, the second antenna receives a signal of at least one of 2G and 3G.

According to various embodiments, the first mode includes at least one of a Simultaneously GSM and LTE (SGLTE) communication mode and a Simultaneous Voice and LTE (SVLTE) communication mode.

According to various embodiments, the electronic device provides a signal received by the second antenna to a diplexer based on the first communication mode.

According to various embodiments, the first modem includes a modem that processes a signal received by the first antenna and a modem that processes a signal received by the second antenna.

According to various embodiments, the electronic device includes a switch that provides a signal provided from the diplexer to the modems.

Figure 5:
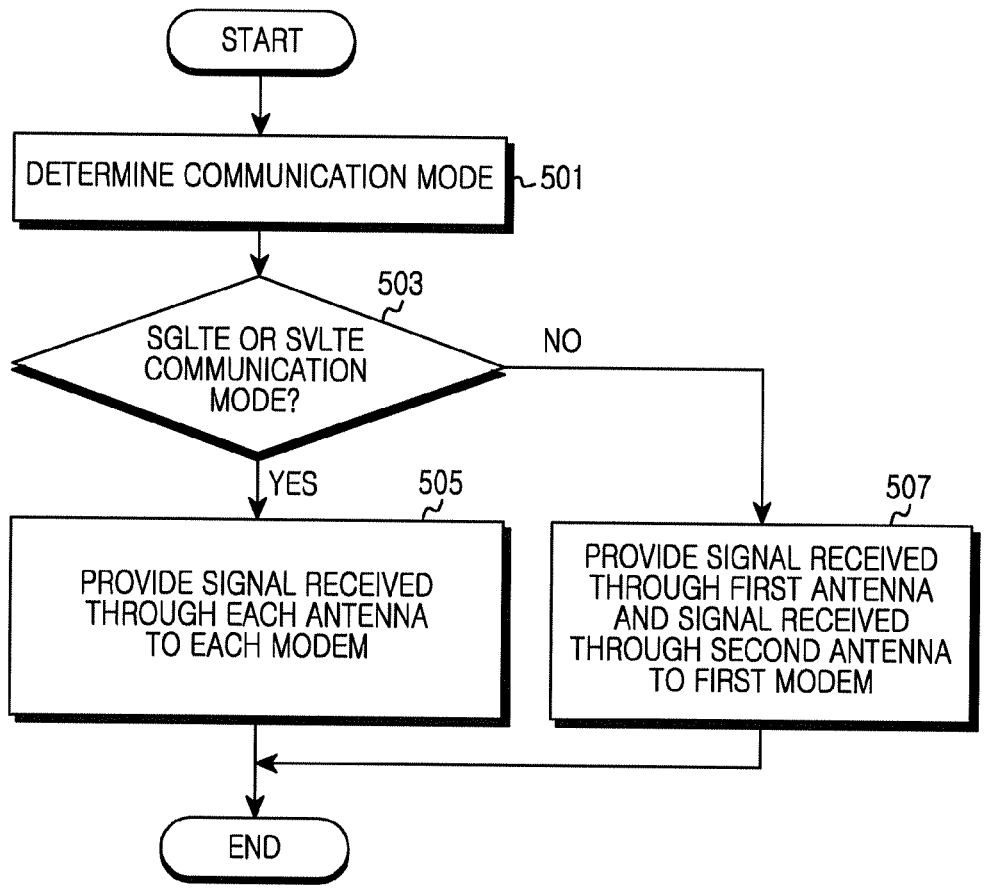
FIG. 5 is a flowchart illustrating operation of an electronic device according to various embodiments of the present disclosure.

FIG. 5 is a flowchart illustrating operation of an electronic device according to various embodiments of the present disclosure.

Referring to FIG. 5, the electronic device includes a first antenna for transmitting and receiving a signal of a first band, for example, a signal of a high frequency band and a second antenna for transmitting and receiving a signal of a second band, for example, a signal of a low frequency band.

The electronic device determines a communication mode thereof (501). According to an embodiment, the electronic device determines a communication mode thereof in consideration of at least one of a characteristic of a Subscriber Identification Module (SIM) card and location information of the electronic device.

The electronic device determines whether the electronic device operates in an SGLTE communication mode or an SVLTE communication mode (503). According to an embodiment, when a SIM card having SGLTE or SVLTE service information is inserted, the electronic device recognizes that the electronic device preferentially operates in the SGLTE communication mode or SVLTE communication mode.

If the electronic device operates in an SGLTE communication mode or an SVLTE communication mode, the electronic device provides a wireless signal received through a first antenna to a first modem and a wireless signal received through a second antenna to a second modem (505).

If the electronic device does not operate in an SGLTE communication mode or an SVLTE communication mode, the electronic device provides a wireless signal received through the first antenna and a wireless signal received through the second antenna to the first modem (507).

According to an embodiment, the electronic device provides a signal received through the second antenna to the first modem using a diplexer.

According to various embodiments, a method of operating an electronic device includes: receiving a first signal transmitted through a first band and a second signal transmitted through a second band; determining a communication mode of the electronic device for processing the first signal and the second signal based on device information or environment information of the electronic device; and processing the first signal and the second signal using at least one of a first modem or a second modem functionally connected to the electronic device based on the communication mode.

According to various embodiments, the processing of the first signal and the second signal includes: processing, when the communication mode is a first mode, the first signal in the first modem and the second signal in the second modem; and processing, when the communication mode is a second mode, the first signal and the second signal in the first modem According to various embodiments, the first signal includes a signal of a high frequency band.

According to various embodiments, the first signal includes at least one communication method of 3G, FDD LTE, TDSCDMA, and TDD LTE.

According to various embodiments, the second signal includes signal of a low frequency band.

According to various embodiments, the second signal includes at least one communication method of 2G and 3G.

According to various embodiments, the first mode includes at least one communication method of an SGLTE communication mode and an SVLTE communication mode.

A term "module" used in the present disclosure indicates a unit including a combination of at least one of, for example, hardware, software, or firmware. The "module" can be interchangeably used with a term such as a unit, logic, a logical block, a component, or a circuit. The "module" can be a minimum unit of an integrally formed component or a portion thereof. The "module" can be a minimum unit that performs at least one function or a portion thereof. The "module" can be mechanically or electronically implemented. For example, a "module" according to the present disclosure includes at least one of an Application-Specific Integrated Circuit (ASIC) chip, Field-Programmable Gate Arrays (FPGAs), or a programmable-logic device that performs any operation known or to be developed.

According to various embodiments, at least a portion of a method (e.g., operations) or a device (e.g., modules or functions thereof) according to the present disclosure can be implemented with an instruction stored at computer-readable storage media in a form of, for example, a programming module. When the instruction is executed by at least one processor, the at least one processor performs a function corresponding to the instruction. The computer readable storage media can be, for example, a memory. At least a portion of the programming module can be implemented (e.g., executed) by, for example, a processor. At least a portion of the programming module can include, for example, a module, a program, a routine, sets of instructions, or a process for performing at least one function.

The computer-readable storage media can include magnetic media such as a hard disk, a floppy disk, and a magnetic tape, optical media such as a Compact Disc Read Only memory (CD-ROM) and a Digital Versatile Disc (DVD), magneto-optical media such as a floptical disk, and a hardware device, specially formed to store and perform a program instruction (e.g., a programming module), such as a Read Only memory (ROM), a Random Access memory (RAM), a flash memory. Further, a program instruction can include a high-level language code that can be executed by a computer using an interpreter as well as a machine language code generated by a compiler. In order to perform operation of the present disclosure, the foregoing hardware device can be formed to operate as at least one software module, and vice versa.

A module or a programming module according to the present disclosure includes at least one of the foregoing constituent elements, can omit some constituent elements, or can further include additional other constituent elements. Operations performed by a module, a programming module, or another constituent element according to the present disclosure can be executed with a sequential, parallel, repeated, or heuristic method. Further, some operations can be executed in different orders, can be omitted, or can add other operations.

According to various exemplary embodiments, in a storage medium that stores instructions, when the instructions are executed by at least one processor, the instructions are set the at least one processor to perform at least one operation, the at least one operation can include operation of receiving a first signal transmitted through a first band and a second signal transmitted through a second band, operation of determining a communication mode of the electronic device for processing the first signal and the second signal based on device information or environment information of the electronic device, and operation of processing the first signal and the second signal using at least one of a first modem or a second modem functionally connected to the electronic device based on the communication mode.

As described above, in order to provide a plurality of communication services, in an electronic device including an antenna that receives a signal of a first band and an antenna that receives a signal of a second band, by processing a signal received from antennas according to a communication method, the electronic device can prevent a voice service and a data service from being dropped.

While the present disclosure has been particularly shown and described with reference to exemplary embodiments thereof, it will be understood by those skilled in the art that various changes in form and details can be made therein without departing from the spirit and scope of the present disclosure as defined by the appended claims.

What is claimed is:

1. A method of operating an electronic device, the method comprising:
   receiving a first signal on a first band via a first antenna for the first band and a second signal on a second band via a second antenna for the second band, wherein the first band is used for a first mobile communication scheme and a second mobile communication scheme, wherein the second band is used for the second mobile communication scheme and a third mobile communication scheme, wherein a part of the first band is higher than a part of the second band, and wherein remaining part of the first band overlaps with remaining part of the second band;
   controlling a diplexer of the electronic device to provide the first signal received via the first antenna to a first modem and the second signal received via the second antenna to a second modem, based on identifying that the second signal is associated with the third mobile communication scheme; and
   controlling the diplexer to provide the first signal received via the first antenna and the second signal received via the second antenna to the first modem, based on identifying that the second signal is associated with the second mobile communication scheme.

2. The method of claim 1, wherein the first band is used for one or more of 3rd generation (3G), frequency division long term evolution (FDD LTE), time division synchronous code division multiple access (TDSCDMA), or time division duplex long term evolution (TDD LTE).

3. The method of claim 1, wherein the second band is used for one or more of 2nd generation (2G) and 3rd generation (3G).

4. The method of claim 1, wherein the electronic device utilizes the third mobile communication scheme by operating one or more of a simultaneous global system for mobile communication and long term evolution (SGLTE) or a simultaneous voice and long term evolution (SVLTE).

5. An electronic device, comprising:
   a first antenna, configured to receive a first signal on a first band, designated for the first band used for a first mobile communication scheme and a second mobile communication scheme;
   a second antenna, configured to receive a second signal on a second band, designated for the second band used for the second mobile communication scheme and a third mobile communication scheme, wherein a part of the first band is higher than a part of the second band, and wherein remaining part of the first band overlaps with remaining part of the second band;
   a first modem connected to the first antenna;
   a second modem connected to the second antenna; and
   a diplexer configured to:
      provide, if the second signal is associated with the third mobile communication scheme, the first signal received via the first antenna to the first modem and the second signal received via the second antenna to the second modem; and
      provide, if the second signal is associated with the second mobile communication scheme, the first signal received via the first antenna and the second signal received via the second antenna to the first modem.

6. The electronic device of claim 5, wherein the first band is used for one or more of 3rd generation (3G), frequency division duplex long term evolution (FDD LTE), time division synchronous code division multiple access (TD-SCDMA), or time division duplex long term evolution (TDD LTE).

7. The electronic device of claim 5, wherein the second band is used for one or more of 2nd generation (2G) or 3rd generation (3G).

8. The electronic device of claim 5, wherein the electronic device utilizes the third mobile communication scheme by operation one or more of a simultaneous global system for mobile communication and long term evolution (SGLTE) or a simultaneous voice and long term evolution (SVLTE).

9. The electronic device of claim 5, wherein the first modem comprises a modem that processes a signal received via the first antenna and a modem is configured to process a signal received via the second antenna.

10. The electronic device of claim 9, wherein the electronic device comprises a switch configured to provide a signal provided from the diplexer to the first modem and the second modem.

11. A non-transitory computer readable recording medium comprising a plurality of instructions configured to, when execute by a processor of an electronic device, cause the processor to:
receive a first signal on a first band via a first antenna for the first band and a second signal on a second band via a second antenna for the second band, wherein the first band is used for a first mobile communication scheme and a second mobile communication scheme, wherein the second band is used for the second mobile communication scheme and a third mobile communication scheme wherein a part of the first band is higher than a part of the second band, and wherein remaining part of the first band overlaps with remaining part of the second band,
controlling a diplexer of the electronic device to provide the first signal received via the first antenna to a first modem and the second signal received via the second antenna to a second modem, based on identifying that the second signal is associated with the third mobile communication scheme; and
controlling the diplexer to provide the first signal received via the first antenna and the second signal received via the second antenna to the first modem, based on identifying that the second signal is associated with the second mobile communication scheme.

12. The non-transitory computer readable recording medium of claim 11, wherein the first band is used for one or more of 3rd generation (3G), frequency division duplex long term evolution (FDD LTE), time division synchronous code division multiple access (TDSCDMA), or time division duplex long term evolution (TDD LTE).

13. The non-transitory computer readable recording medium of claim 11, wherein the second band is used for one or more of 2nd generation (2G) or 3rd generation (3G).

* * * * *